(12) United States Patent  
Soundararajan et al.

(10) Patent No.: US 8,909,602 B2  
(45) Date of Patent: Dec. 9, 2014

(54) PROGRAMMATIC SNAPSHOT AND REVERT OF VIRTUALIZED DATA CENTER INVENTORY

(75) Inventors: Vijayaraghavan Soundararajan, Palo Alto, CA (US); Balaji Parimi, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 28 days.

(21) Appl. No.: 13/020,300

(22) Filed: Feb. 3, 2011

(65) Prior Publication Data

US 2012/0203739 A1 Aug. 9, 2012

(51) Int. Cl.
  *G06F 17/30* (2006.01)
  *G06F 9/455* (2006.01)
  *G06F 9/50* (2006.01)

(52) U.S. Cl.
  CPC .... *G06F 9/45558* (2013.01); *G06F 2009/4557* (2013.01); *G06F 9/5077* (2013.01)
  USPC .......................................... 707/639

(58) Field of Classification Search
  USPC ................................. 707/639, 686
  See application file for complete search history.

(56) References Cited

U.S. PATENT DOCUMENTS

| | | | |
|---|---|---|---|
| 2009/0260007 A1* | 10/2009 | Beaty et al. | 718/1 |
| 2010/0138830 A1* | 6/2010 | Astete et al. | 718/1 |
| 2010/0169948 A1* | 7/2010 | Budko et al. | 726/1 |
| 2010/0235828 A1* | 9/2010 | Nishimura et al. | 717/174 |
| 2010/0290473 A1* | 11/2010 | Enduri et al. | 370/395.53 |
| 2011/0106929 A1* | 5/2011 | Lee et al. | 709/223 |
| 2011/0154331 A1* | 6/2011 | Ciano et al. | 718/1 |

* cited by examiner

*Primary Examiner* — Khanh Pham

(57) ABSTRACT

A snapshot of an inventory of a virtualized computer system is produced and a user-editable code is generated therefrom, so that the inventory can be reconstructed entirely or partially. The snapshot includes identifying data for items in the virtualized computer system, and relationship data that indicate hierarchical and non-hierarchical relationships between the items. The items in the inventory of the virtualized computer system include virtual machines, servers on which the virtual machines are running, one or more data centers in which the servers reside, and logical containers such as folders for virtual machines, resource pools that each contain one or more virtual machines, and server clusters that each contain one or more servers.

20 Claims, 11 Drawing Sheets

PROGRAMMATIC SNAPSHOT AND REVERT OF VIRTUALIZED DATA CENTER INVENTORY

BACKGROUND

Software for managing a virtualized data center is responsible for monitoring physical hosts and virtual machines (VMs) running in the physical hosts and, further, for performing management operations such as provisioning and configuration tasks. One example of such management software is vSphere™ by VMware of Palo Alto, Calif. The complete set of hosts, VMs, data storage elements (datastores), networks, and the organization of these elements into data centers, clusters, and resource pools, managed by such software, is commonly referred to as a virtualized computer inventory (hereinafter referred to as the "inventory").

Under certain circumstances, migration or reconstruction of an inventory may be desired or needed. For example, when a given cluster and the settings associated therewith have been tested in development and are ready to be moved into production, the production inventory is reconstructed from the development inventory. To give another example, an existing inventory that works well for a data center or across multiple data centers may be replicated by administrators for use with different data centers.

Conventional methods that have been used to perform inventory migrations or reconstructions include archiving the inventory database and replicating the archived inventory database for use in a different environment. These methods, however, have several drawbacks. For example, in vSphere™, when a management server is connected to the archived inventory database, all hosts in the inventory are initialized in a disconnected state and must be explicitly added by the administrator, which is tedious and time-consuming. Another limitation of the conventional methods is that partial migration or reconstruction is not permitted. There is no way for an administrator using the conventional methods to migrate or reconstruct a sub-portion of the inventory.

SUMMARY

One or more embodiments of the present invention provide a method of generating a snapshot of an inventory of a virtualized computer system and restoring the inventory in the same or different virtualized computer system entirely or partially. According to the embodiments, a virtual machine management server is queried to retrieve and store relationships between various entities included in the inventory of the virtualized computer system, the permissions and roles associated with those entities, and the configuration settings of those entities. From this stored data, a code for reconstructing the inventory of the virtualized computer system is generated. The code is generated in user-editable format to enable administrators to customize the inventory that is reconstructed from the code.

A method of producing a snapshot of an inventory of a virtualized computer system, according to an embodiment of the present invention, includes the step of identifying items in the inventory, determining hierarchical and other relationships between the items, and storing identifying data for the items, the hierarchical relationships, and the other relationships in a storage device as a snapshot of the inventory. The items in the inventory include virtual machines, servers on which the virtual machines are running, one or more data centers in which the servers reside, and logical containers, the logical containers including folders for virtual machines, resource pools that each contain one or more virtual machines, and server clusters that each contain one or more servers. The other relationships of the items include a relationship between a resource pool and a group of virtual machines that is not hierarchical.

A method of producing a snapshot of an inventory of a first virtualized computer system and generating a second virtualized computer system from the snapshot, according to an embodiment of the present invention, includes the steps of producing a snapshot of an inventory of a first virtualized computer system, the inventory including identifying data for items in the inventory and relationships between the items, generating a user-editable code from the snapshot, modifying the user-editable code, and generating a second virtualized computer system using the modified user-editable code.

Further embodiments of the present invention provide a non-transitory computer-readable storage medium that includes instructions for causing a computer system to carry out one or more of the methods set forth above.

DETAILED DESCRIPTION

Figure 1:
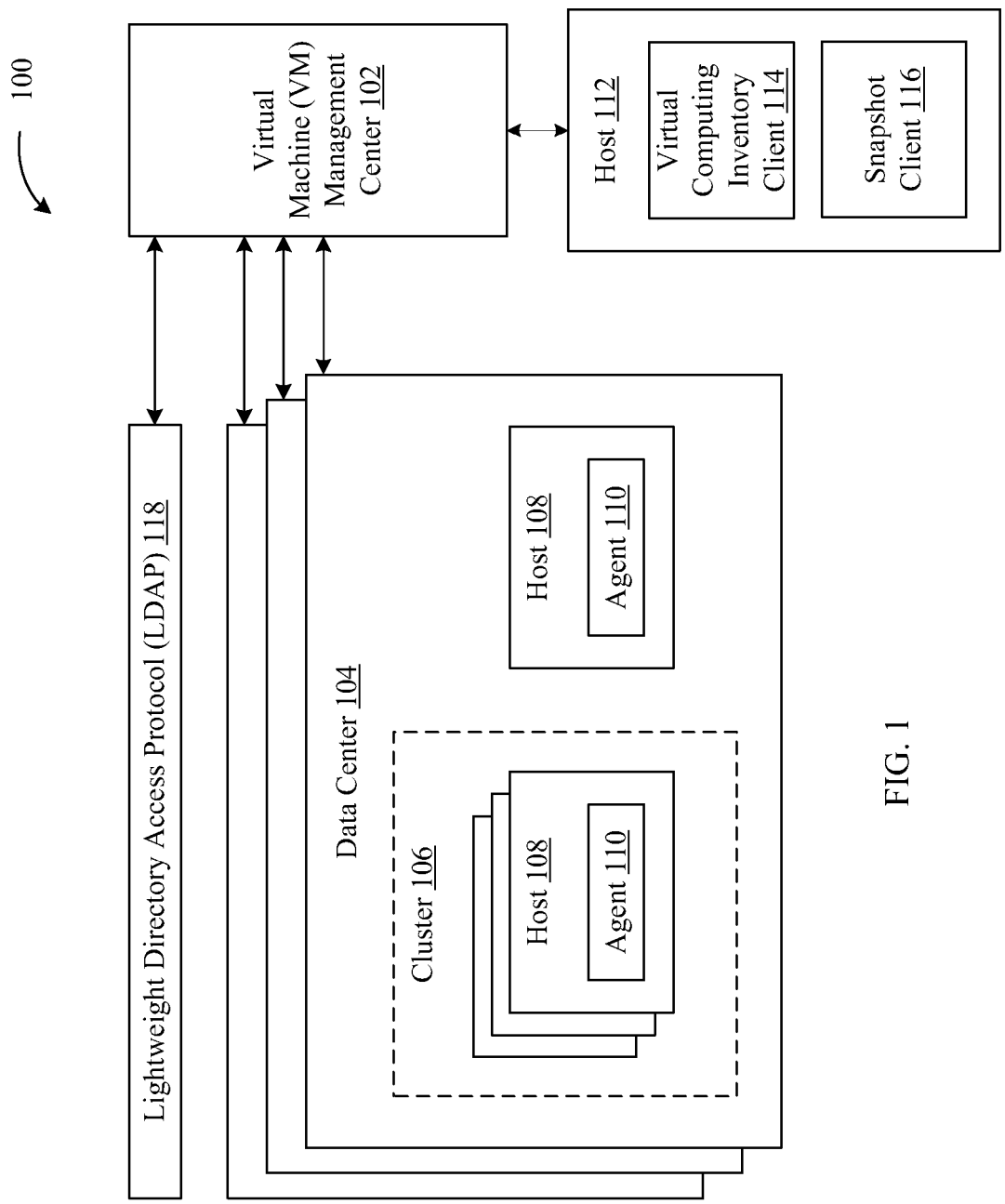
FIG. 1 depicts a block diagram of a virtualized computer system in which one or more embodiments of the present invention may be implemented.

FIG. 1 depicts a block diagram of a virtualized computer system 100 in which one or more embodiments of the present invention may be implemented. As illustrated, virtualized computer system 100 includes data centers of which only a first data center 104 is shown. First data center includes cluster 106 and host computers 108. Here, host computers 108 (also referred to herein as "servers") are configured to deliver virtualization-based distributed services to information technology environments, and may or may not be included in a cluster, e.g. cluster 106. Each host computer 108 provides a virtualization layer that abstracts processor, memory, storage, and/or networking resources into multiple virtual machines that run side-by-side on the same host computer 108, as further described in conjunction with FIG. 2.

A virtual machine (VM) management center 102 is also included in system 100. VM management center 102 manages the virtual computer inventory, including managing data centers 104, the virtual machines running within each host computer 108, provisioning, migration, resource allocations, and so on. In one embodiment, VM management center 102 is configured to interact with agent 110 included in host computers 108 to exchange information using application programming interface calls (API) calls.

A VM management center client (VI client) 114, as shown in FIG. 1, is executed on a host computer 112 which is separate from virtualized computer system 100. Here, VI client 114 is configured to, in conjunction with snapshot client 116, interact with VM management center 102 using various techniques including, but not limited to, API calls, web services messages, and the like. VI client 114 can be used to perform one or more tasks requested by an administrator, such as configuring storage and network connections, managing a service console, or querying data from host computers via agent 110. In one embodiment, a stand-alone application version of VI client 114 is provided. In another embodiment, a web browser application provides the functionality of VI client 114. VM management center 102 is used by an administrator to customize roles and permissions for various users. The administrator may perform this task by selecting from an extensive list of permissions to grant to each role and assigning roles the users. In one embodiment, such roles and permissions are stored separately from VM management center 102 in a lightweight directory access protocol (LDAP) database 118, as illustrated in FIG. 1. In other embodiments, the roles and permissions may be stored within and managed by VM management center 102. It should be recognized that responsibilities for specific virtualized computer inventory components, such as resource pools, can be delegated based on business organization or ownership. VM management center 102 can also provide full audit tracking to provide a detailed record of every action and operation performed on the virtualized computer inventory. As described in greater detail herein, embodiments of the invention provide a user interface for snapshot client 116 that allows an administrator to create a snapshot of an inventory managed by VM management center 102.

Figure 2:
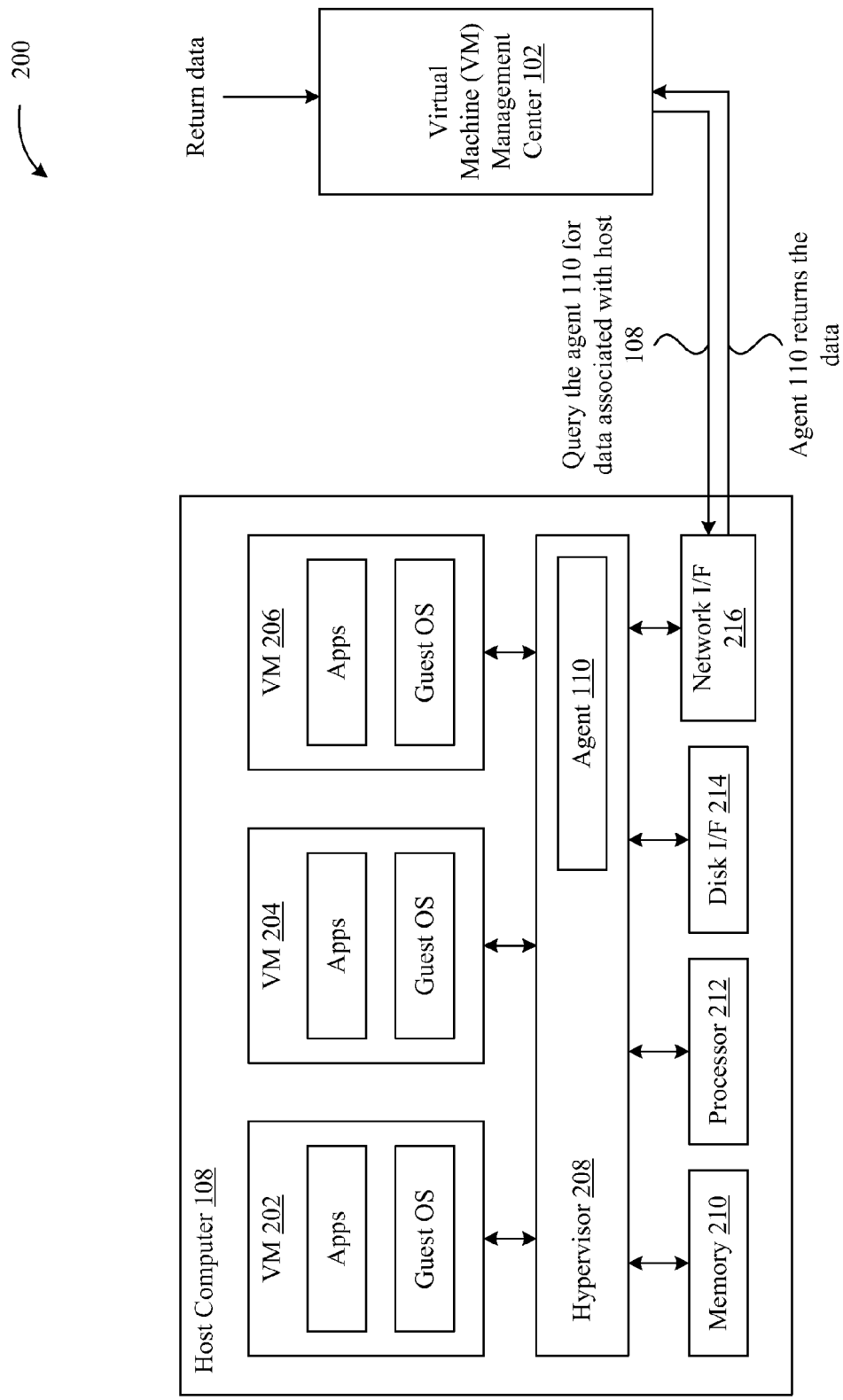
FIG. 2 depicts a block diagram of a host computer and VM management center, according to one embodiment of the invention.

FIG. 2 depicts a block diagram of a host computer 108 and VM management center 102, according to one embodiment of the invention. A virtualized computing environment includes a host computer 108 that has conventional components of a computing device. One or more virtual machines are configured within host computer 108, represented in FIG. 2 as VM 202, VM 204, and VM 206, which share hardware resources of host computer 108, such as memory 210, processor 212, disk interface 214, and network interface 216. Examples of disk interface 214 are a host bus adapter and a network file system interface. An example of network interface 216 is a network adapter, also referred to as a Network Interface Card (NIC). In some embodiments, a plurality of NICs is included in the network interface 216.

The virtual machines run on top of hypervisor 208, which is a software interface layer that enables sharing of the hardware resources of host computer 108 by the virtual machines. Hypervisor 208 may run on top of the operating system of the host computer 108 or directly on hardware components of the host computer 108. Each virtual machine includes a guest operating system and one or more guest applications. The guest operating system is a master control program of the virtual machine and, among other things, the guest operating system forms a software platform on top of which the guest applications run. As also shown, agent 110 is provided in hypervisor 208, by which specific information pertaining to the virtualization settings and configurations of host computer 108, and any VMs included therein, is transmitted to VM management center 102 when queried by snapshot client 116 as will be further described below. However, in the event that the VM management center 102 is unavailable, the databases to which the VM management center 102 is attached, e.g., LDAP 118 any additional databases (not shown) that include the information may be queried directly by the snapshot client 116.

Figure 3:
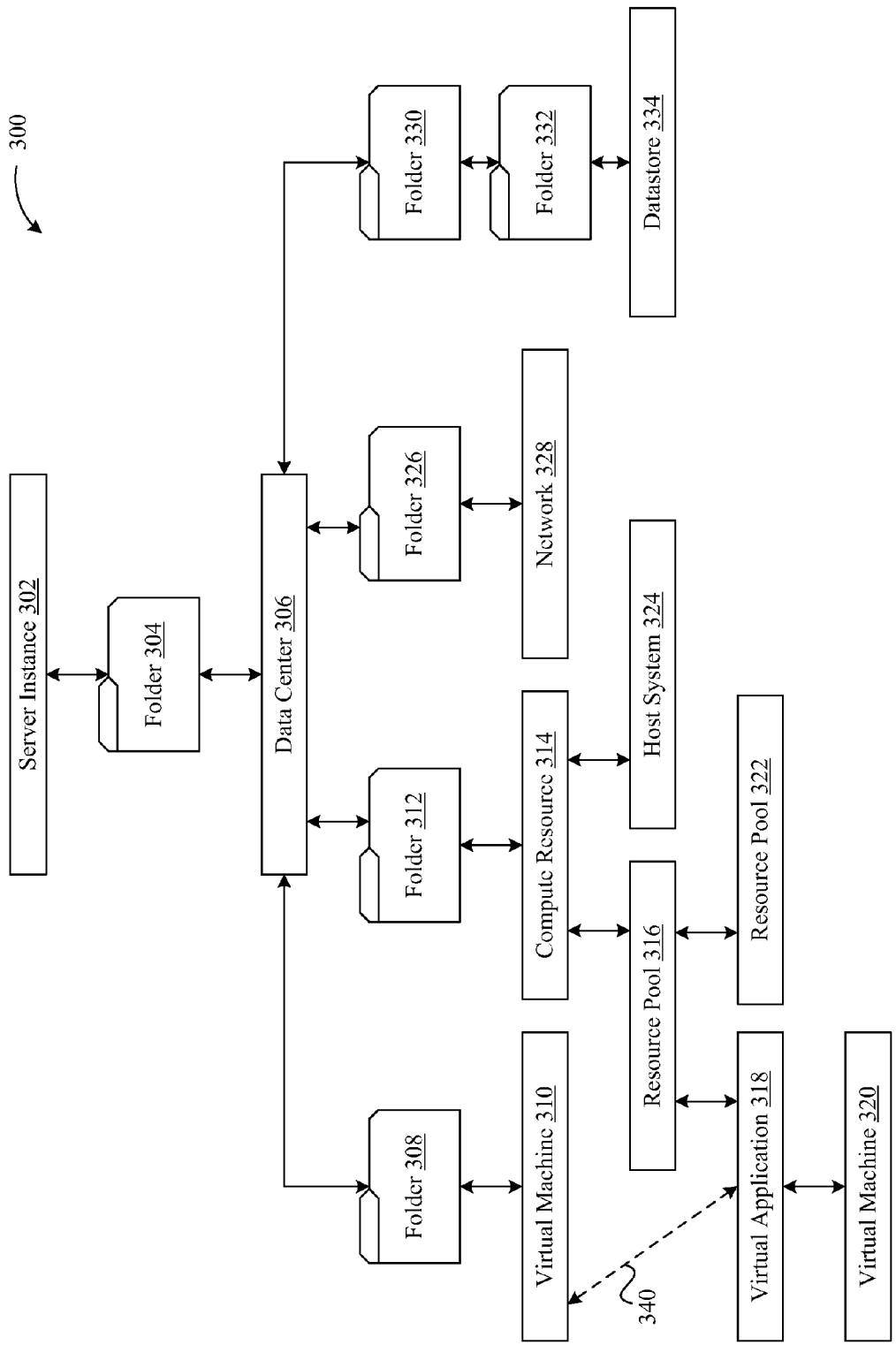
FIG. 3 depicts an exemplary hierarchical organization of a virtualized computer inventory, according to one embodiment of the invention.

FIG. 3 depicts an exemplary hierarchical organization of a virtualized computer inventory 300, according to one embodiment of the invention. Note that, although only certain entities included in the virtualized computer inventory 300 are illustrated as nested entities, the folders, the resource pools, and the virtual applications are capable of being nested. As illustrated, a server instance 302 is at the root of the hierarchy and includes folder 304, which includes data center 306. Here, folders are logical containers of entities managed by VM management center 102. Data center 306 includes folder 308, folder 312, folder 326, and folder 330. Folder 308 includes virtual machine 310. Folder 312 includes compute resource 314, which includes resource pool 316 and host system 324. Resource pool 316 includes virtual application 318 and resource pool 322, where virtual application 318 includes virtual machine 320. Additionally, folder 326 includes network 328, where the network represents, for example, a virtualized computer network, a distributed virtual switch, a distributed virtual port group, or the like. Finally, folder 330 includes folder 332, which includes datastore 334. It should be recognized that virtualized computer inventory 300 can be modified by an administrator using a user interface to include other server instances, folders, data centers, virtual machines, compute resources, resource pools, virtual applications, networks, datastores, distributed virtual switches, virtual ports, and the like, and change the relationships between the entities.

The relationships set forth in virtualized computer inventory 300 are explicit relationships that are identifiable based on the hosts, clusters, and VMs view shown in FIG. 3. However, implicit relationships, which are relationships between entities that are not identifiable according to the view presented in FIG. 3—may be present in virtualized computer inventory 300. Relationship 340 represents an implicit relationship that exists between virtual machine 310 and virtual application 318 that is not recognizable when viewing virtualized computer inventory 300 according to in the view in FIG. 3. Under other views, e.g., hosts and clusters view, or VMs and VM folders view, the implicit relationship may be viewed as an explicit relationship. These implicit relationships are identifiable by parsing and processing information associated with virtualized computer inventory 300, as further described below in conjunction with FIG. 4.

FIG. 4 is a flow diagram of a method 400 for generating a snapshot of a virtualized computer inventory, according to one or more embodiments of the present invention. Although the method steps are described in conjunction with the systems of FIGS. 1-3, persons skilled in the art will understand that any system configured to perform the method steps is within the scope of the invention.

As shown, method 400 begins at step 402, where snapshot client 116 running in host computer 112 initializes a process to determine relational data between entities included in an inventory managed by a management server, i.e., virtualized computer inventory 300 and VM management center 102, respectively. To accomplish this determination, snapshot client 116, at step 404 illustrated in FIG. 4B, queries VM management center 102 for a list of object references that each reference a different entity included in virtualized computer inventory 300, e.g., folder 304, data center 306, folders 308-312, etc. as illustrated in FIG. 3.

At step 406, snapshot client 116 obtains, for each object reference, a name of the referenced entity. In one example, data center 306 in virtualized computer inventory 300 is associated with the name "Main_Data center." At step 408, snapshot client 116 obtains, for each object reference, a name of a data center to which each referenced entity belongs. Continuing with reference to the virtualized computer inventory 300, snapshot client 116 determines that each of entities 308-334 belong to data center 306. This is useful because certain entity names (e.g., of distributed virtual switches) are required to be unique within a particular data center, but not across one or more data centers. Thus, the obtained names of data centers can be used when reconstructing virtualized computer inventory 300 to specify precisely which entity is being restored.

At step 410, snapshot client 116 obtains, for each object reference that references a VM entity, a name of a resource pool to which the VM entity belongs. Thus, according to virtualized computer inventory 300, snapshot client 116 determines that VM 320 belongs to resource pool 316. This information is useful because the explicit parent for a VM is a VM folder, but a resource pool may exist as an implicit parent to the VM. More specifically, a VM may reside within a resource pool, even though the resource pool is not a parent to the VM. During reconstruction of virtualized computer inventory 300, a VM must be added to virtualized computer inventory 300 before it can be moved into a resource pool.

At step 412, snapshot client 116 queries VM management center 102 for each object reference to determine a parent entity to the referenced entity. For example, with respect to virtualized computer inventory 300, the parent to resource pool 322 is resource pool 316, and the parent to host system 324 is compute resource 314.

At step 414, snapshot client 116 creates, based on the determined parent entities, parent to child relationships between the entities. At step 416, snapshot client 116 creates, based on the determined parent entities, child to parent relationships between the entities. In addition, snapshot client 116 identifies, based on the parent to child and child to parent relationships between the entities, remaining implicit relationships between the entities. For example, in vSphere™, a VM may belong to a folder, an aggregation of VMs (vApp), or both. In the case that the VM belongs to both a folder and an aggregation of VMs, the folder is an explicit parent to the VM, while the vApp is an implicit parent to the VM. Thus, snapshot client 116 identifies relationships between entities by querying VM management center 102 for VMs that are managed by each vApp included in virtualized computer inventory 300. Host 112 further identifies any parent folders to each vApp included in virtualized computer inventory 300. Such identifications are necessary when reconstructing virtualized computer inventory 300. For example, when reconstructing virtualized computer inventory 300 using vSphere™, a vApp must be added before the vApp is included in a folder. Therefore, the folder must be tracked during the reconstruction of virtualized computer inventory 300 so that the vApp is moved properly after being added. Note that snapshot client 116 is configurable to remove any redundant relational data, thereby decreasing the overall amount of memory and processing resources required to store and generate the snapshot. At step 418, snapshot client 116 stores the obtained and determined data as inventory relational data in a memory, e.g. memory 210.

Figure 4A:
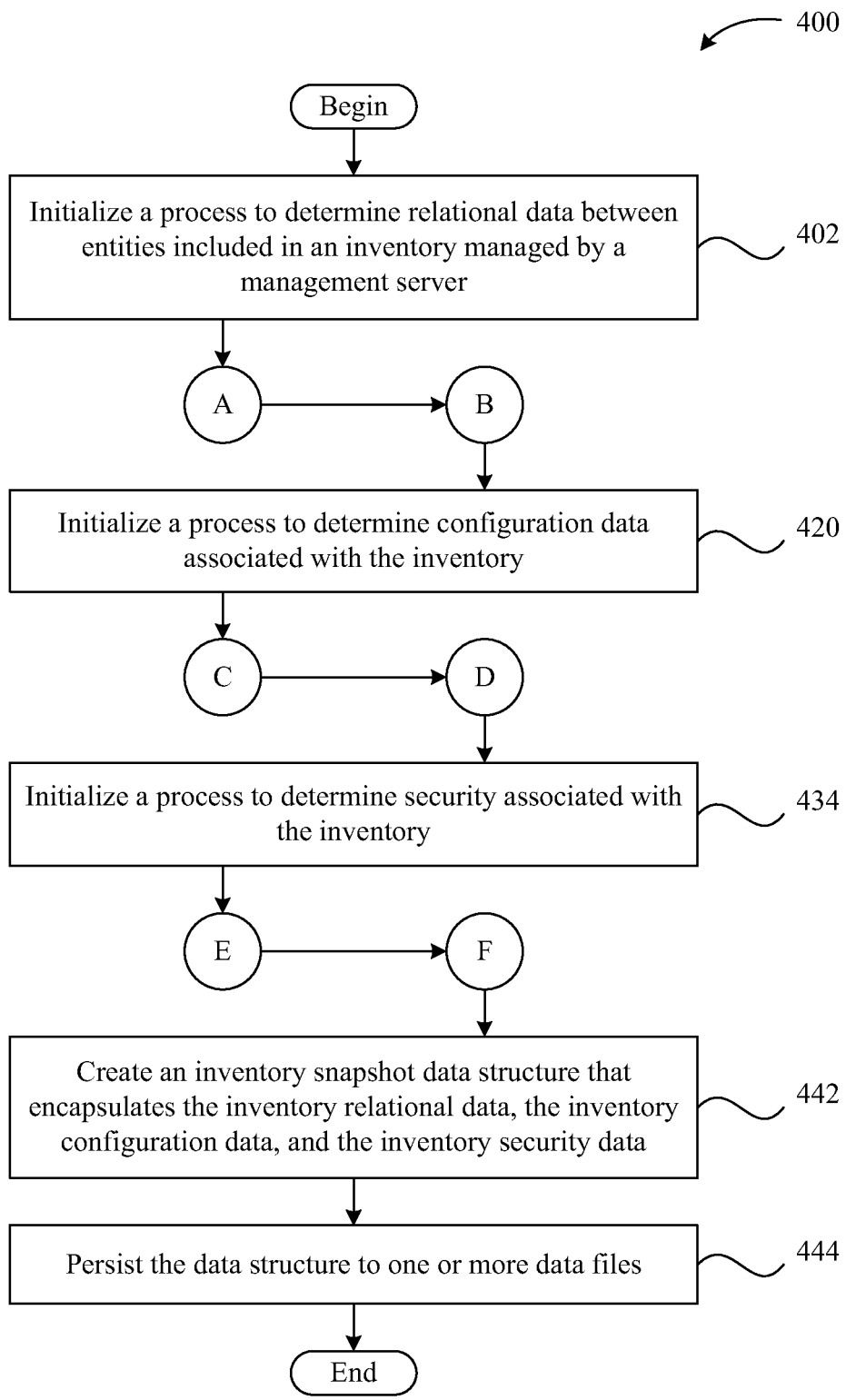
FIGS. 4A-4D are a flow diagram of method steps for generating a snapshot of a virtualized computer inventory, according to one or more embodiments of the present invention.
Figure 4B:
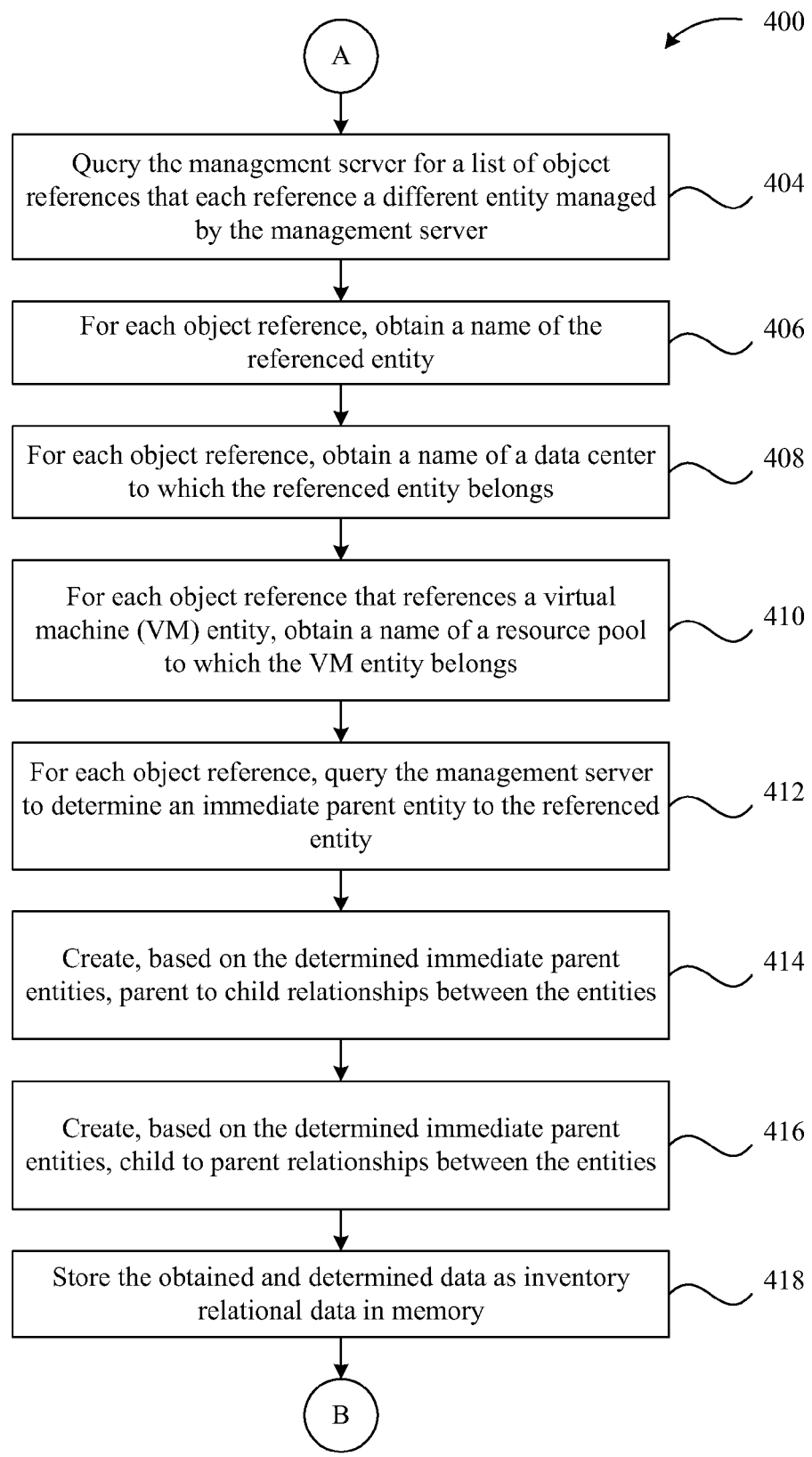
Figure 4C:
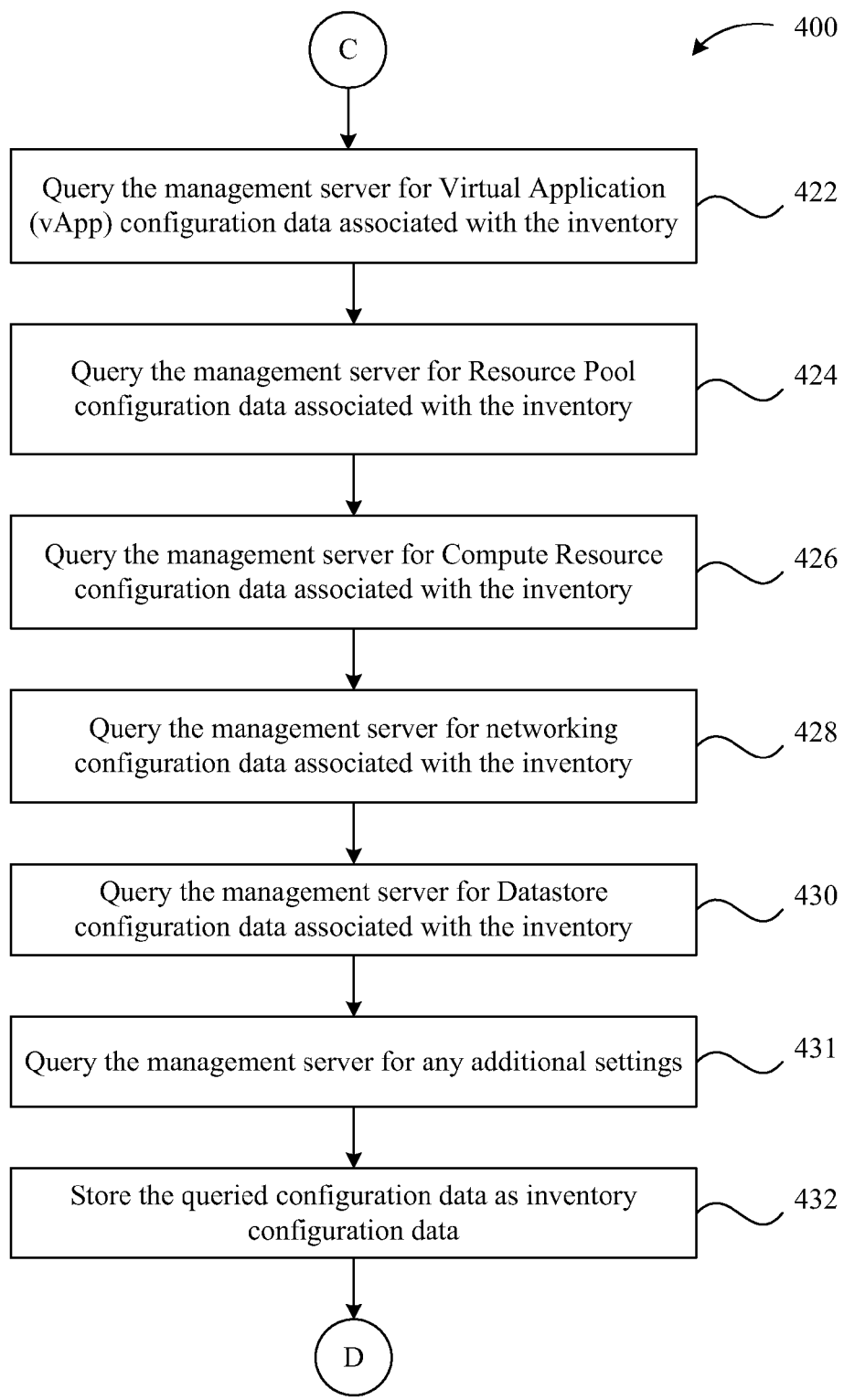
Figure 4D:
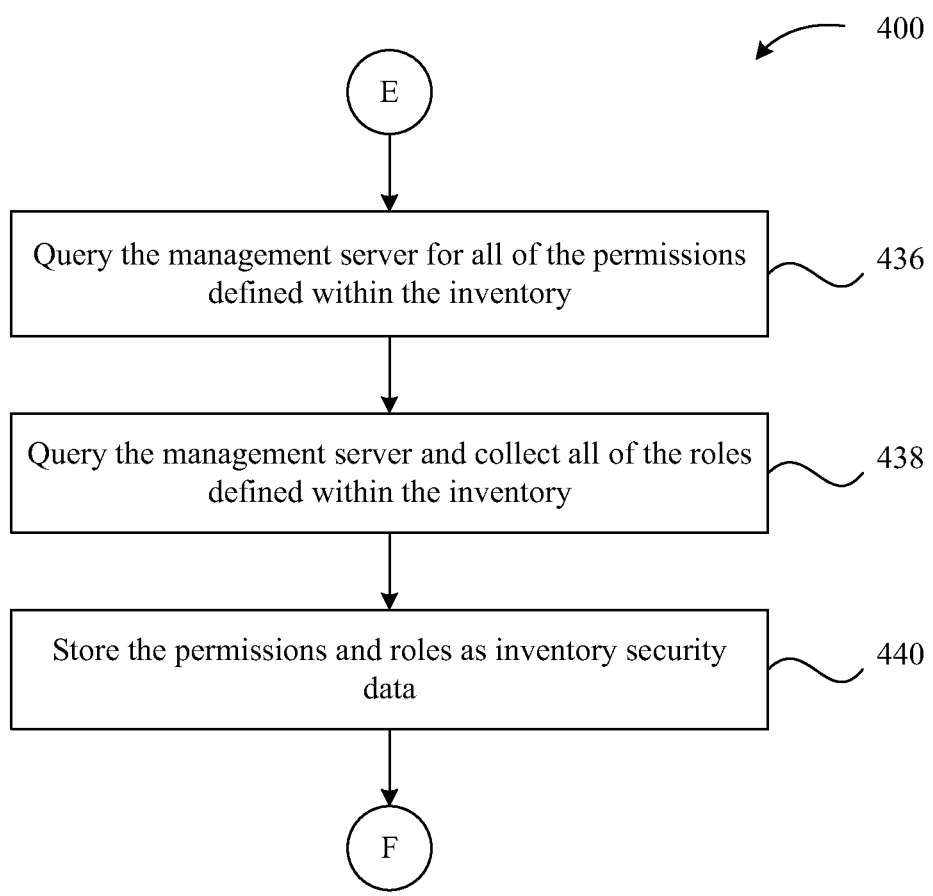

Referring now back to FIG. 4A, at step 420, snapshot client 116 initializes a process to determine configuration data associated with the inventory. At step 422, illustrated in FIG. 4B, snapshot client 116 queries VM management center 102 for virtual application (vApp) configuration data associated with virtualized computer inventory 300. In turn, VM management center 102, if required, communicates with agents 110 included in hosts 108 to obtain configuration data. This configuration data specifies at least the VMs included in each vApp, and any resource settings corresponding thereto, e.g., CPU and memory limitations, shares, and reservations of the vApp.

At step 424, snapshot client 116 queries VM management center 102 for resource pool configuration data associated with virtualized computer inventory 300, e.g., configuration data associated with resource pool 316. This configuration data specifies at least the VMs included each resource pool, and any resource settings corresponding thereto, e.g., central processing unit (CPU) and memory limitations, shares, and reservations of the resource pool.

At step 426, snapshot client 116 queries VM management center 102 for compute resource configuration data associated with virtualized computer inventory 300, e.g., configuration data associated with compute resource 314. Compute resource configuration data is pertinent to the creation of a cluster and/or a host when reconstructing virtualized computer inventory 300 in order to reflect specific hardware configurations associated therewith.

At step 428, snapshot client 116 queries VM management center 102 for networking configuration data associated with virtualized computer inventory 300, e.g., configuration data associated with network 328. The networking configuration data specifies at least port groups and network shaping settings.

At step 430, snapshot client 116 queries VM management center 102 for datastore configuration data associated with virtualized computer inventory 300, e.g., configuration data associated with datastore 334. The datastore configuration data specifies at least input/output (IO) policies associated with each datastore included in virtualized computer inventory 300.

In addition, at step 431, snapshot client 116 queries VM management center 102 for any additional data that is required to perform a reconstruction of virtualized computer inventory 300. Finally, at step 432, snapshot client 116 stores the queried configuration data as inventory configuration data in memory 210.

Referring now back to FIG. 4A, at step 434, snapshot client 116 initializes a process to determine security associated with the inventory. At step 436, illustrated in FIG. 4D, snapshot client 116 queries VM management center 102 for all of the permissions defined within virtualized computer inventory 300. In one embodiment, these permissions are hierarchical, and snapshot client 116 collects all permissions and then maps them to according to their placement within virtualized computer inventory 300. For example, if a given permission applies to data center 306 and all VMs included therein, this information is stored so that, during reconstruction of virtualized computer inventory 300, the permission can be applied to a restored data center 306, the permission indicating that it also applies to all child VMs of data center 306.

At step 438, snapshot client 116 queries VM management center 102 and collects all of the roles defined within virtualized computer inventory 300, where each role belongs to one or more permissions. At step 440, Snapshot client 116 stores the permissions and roles as inventory security data in memory 210.

Referring now back to FIG. 4A, at step 442, snapshot client 116 creates an inventory snapshot data structure that encapsulates the inventory relational data, the inventory configuration data, and the inventory security data. In one embodiment, the inventory relational data is processed to be represented using a linked list. More specifically, each node in the linked list represents a different entity in the virtualized computer inventory 300, where each edge that links two node entities represents the relationship between the two node entities. Accordingly, the linked list may be used to facilitate the reconstruction process described below in conjunction with FIG. 5. Finally, at step 444, snapshot client 116 persists the data structure to one or more data files, and method 400 ends.

Thus, upon completion of the steps in method 400, the one or more data files include all information required to generate code that, when executed, reconstructs virtualized computer inventory 300 in the same or another VM management center 102. In one embodiment, reconstructing an inventory is performed via a two-phase process. The first phase involves parsing a snapshot of virtualized computer inventory 300 and generating code for reconstructing virtualized computer inventory 300 in whole, or in part. The second phase involves executing the code to reconstruct virtualized computer inventory 300. In one embodiment, the code is generated in a format that is executable by software that possesses the security rights to reconstruct virtualized computer inventory 300 within VM management center 102. One example of such software is PowerShell.

Several advantages are realized when using this two-phase process and generating code instead of actively executing the reconstruction process. For example, the code is distributable to multiple administrators so that each administrator can easily reconstruct virtualized computer inventory 300. In another example, the code is modifiable to, when executed, cause the reconstruction of only a portion of virtualized computer inventory 300 (e.g., only reconstructing a cluster as needed). In yet another example, the code is modifiable to, when executed, reconstruct virtualized computer inventory 300 with differently-named entities. Such renaming is beneficial, for example, when an administrator is looking to duplicate virtualized computer inventory 300 while avoiding naming ambiguities.

Figure 5A:
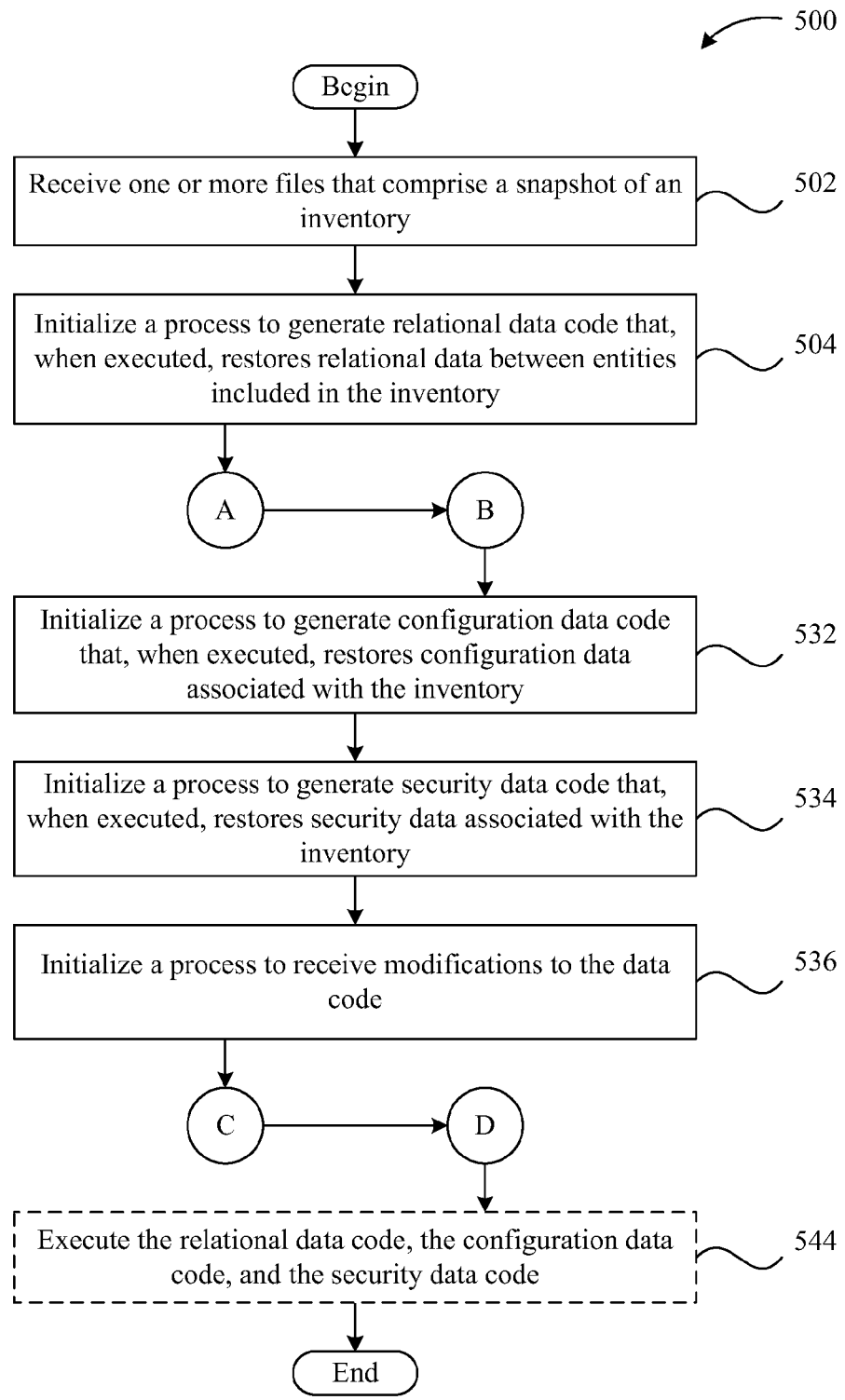
FIGS. 5A-5C are a flow diagram of method steps for generating code to reconstruct a virtualized computer inventory, according to one or more embodiments of the present invention.
Figure 5B:
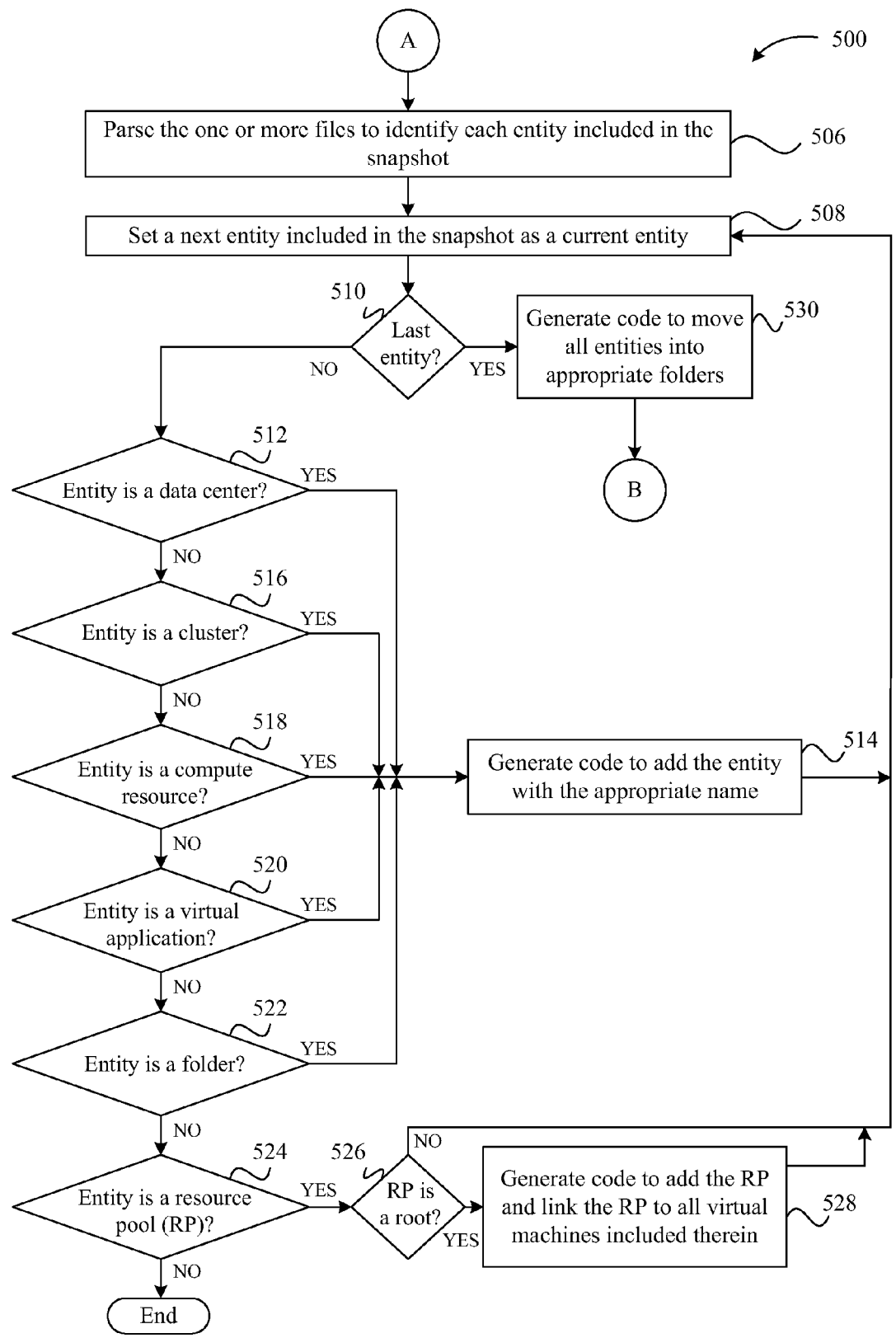
Figure 5C:
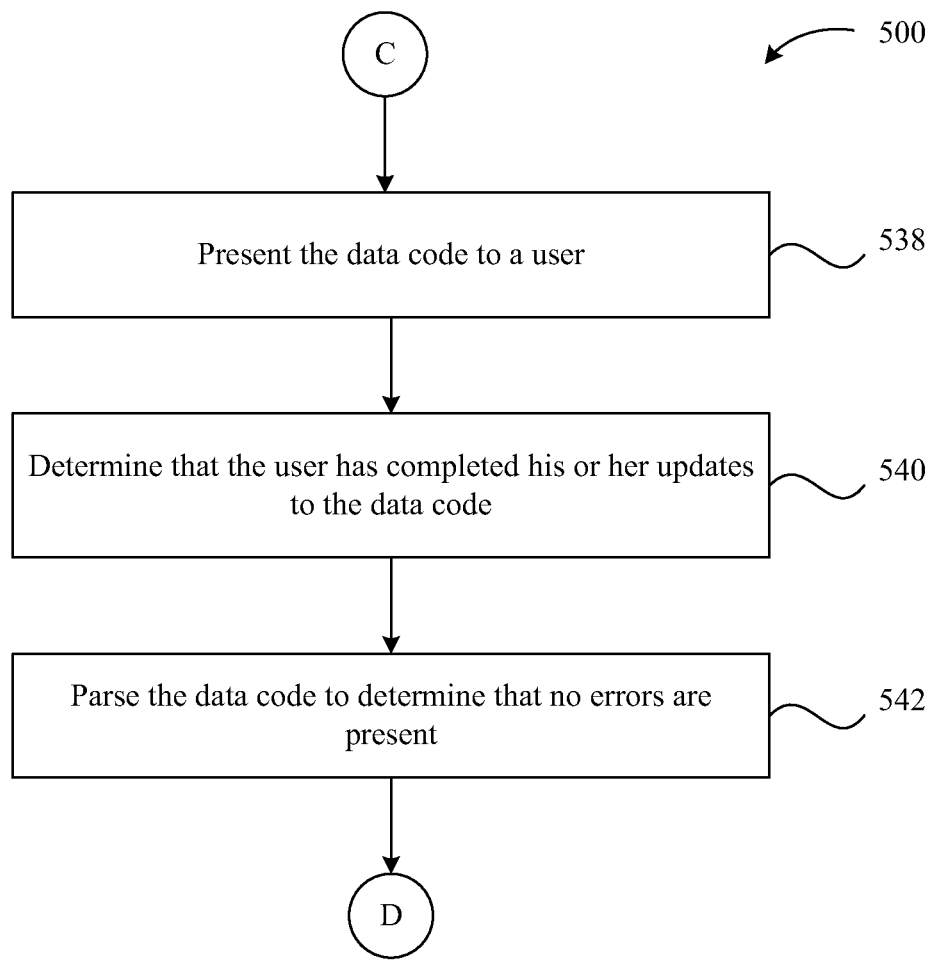

FIG. 5 is a flow diagram of a method 500 for generating code to reconstruct virtualized computer inventory 300, according to one or more embodiments of the present invention. Although the method steps are described in conjunction with the systems of FIGS. 1-4, persons skilled in the art will understand that any system configured to perform the method steps is within the scope of the invention.

As shown, method 500 begins at step 502, where snapshot client 116 receives one or more files (i.e., the files generated at step 444 in FIG. 4) that comprise a snapshot of virtualized computer inventory 300. At step 504, snapshot client 116 initializes a process to generate relational data code that, when executed, restores relational data between entities included in virtualized computer inventory 300.

Referring now to FIG. 5B, at step 506, snapshot client 116 parses the one or more files to identify each entity included in the snapshot. Continuing with the linked list described above in conjunction with FIG. 4, snapshot client 116 begins at the root of the linked list and identifies each entity by traversing the nodes and edges included in the linked list in a parent to child fashion. Accordingly, at step 508, the snapshot client 116 sets a next entity included in the snapshot as a current entity. At step 510, snapshot client 116 determines whether all entities in the snapshot have been parsed. Thus, steps 508 and 510 ensure that each and every entity included in the snapshot are processed by snapshot client 116.

At step 512, snapshot client 116 determines whether the entity is a data center and, if so, at step 514 snapshot client 116 generates code that, when executed, adds the data center to virtualized computer inventory 300 and associates the data center with a corresponding name included in the one or more files.

At step 516, snapshot client 116 determines whether the entity is a cluster and, if so, at step 514 snapshot client 116 generates code that, when executed, adds the cluster to virtualized computer inventory 300 and associates the cluster with a corresponding name included in the one or more files. Because clusters include one or more hosts, snapshot client 116 also generates code that, when executed, adds to virtualized computer inventory 300 the hosts that are included in the cluster, and, further, adds all VMs to virtualized computer inventory 300 that are associated with the hosts. More specifically, in vSphere™, when a host is added to the virtualized computer inventory 300, all VMs that belong to the host are automatically added, thereby eliminating the need to track which VMs belong to which hosts. In addition, the code is supplemented to, when executed, associate the cluster with corresponding configuration settings included in the one or more files.

At step 518, snapshot client 116 determines whether the entity is a compute resource (i.e., a standalone host that is not part of a cluster). Because a compute resource is not part of a cluster, snapshot client 116 also generates code that, when executed, adds the compute resource to virtualized computer inventory 300, and, further, adds all VMs to virtualized computer inventory 300 that are associated with the compute resource, as described above.

At step 520, snapshot client 116 determines whether the entity is a vApp and, if so, at step 514 snapshot client 116 generates code that, when executed, adds the vApp to virtualized computer inventory 300 and associates the vApp with a corresponding name included in the one or more files. In addition, at step 520, snapshot client 116 must consider that the vApp may include other vApps and/or VMs. Thus, snapshot client 116 must also generate code that, when executed, associates the vApp with child vApps or child VMs thereof. However, for this association to succeed, each child VM must already be established within the reconstructed virtualized computer inventory 300, otherwise execution of the code would fail when attempting to create an association between the vApp and a non-existent child VM. These issues, however, are avoided as described below.

With respect to child vApps: because snapshot client 116 traverses the linked list in a parent to child fashion, when a child vApp is reached, code to generate the parent vApp has, inherently, already been generated. Further, since execution of the code occurs in a sequential fashion, when execution of code to add the child vApp occurs, execution of code to add the parent vApp has already been executed. As a result, each child vApp can be readily associated with its parent. With respect to child VMs, since a vApp is a child to a cluster or a compute resource, and since snapshot client 116 traverses the linked list in a parent to child fashion, code to generate the parent cluster or compute resource—and any VMs associated therewith—has already been generated at step 516 or at step 518. Therefore, the code generated at step 520 executes after any child VMs associated with this vApp have, inherently, already been added to the inventory and can be readily associated with the vApp.

At step 522, snapshot client 116 determines whether the entity is a folder. In vSphere™, all virtualized computer inventories consist of a number of default root folders, which are implicitly added when virtualized computer inventory 300 is reconstructed. For example, a root network folder is added whenever a data center is added, where a parent to the root network folder is a data center. There are also datastore folders, host folders, and VM folders, where a root folder of each type is implicitly added to virtualized computer inventory 300 when the data center is added to virtualized computer inventory 300. Another type of folder is a data center folder, which is implicitly added when reconstructed virtualized computer inventory 300 is initialized (i.e., when the VM management 102 is started for the first time). When snapshot client 116 encounters a root folder, snapshot client 116 generates no code. However, when snapshot client 116 encounters a non-root folder, snapshot client 116 generates code that, when executed, adds the folder to virtualized computer inventory 300 and associates the folder with a corresponding name included in the one or more files.

As previously described herein, a folder entity may include one or more VMs. As also previously described, each VM must be associated with either a compute resource or a cluster, and that a parent to a VM is typically a VM folder. Accordingly, if snapshot client 116 encounters a VM folder in the linked list before snapshot client 116 encounters the compute resource or the cluster associated with the VMs included in the VM folder, then no code for reconstructing the VMs has been generated. As a result, the VMs cannot be moved into the appropriate VM folder. Snapshot client 116 avoids this situation, however, by moving VMs into folders as part of a second traversal of the linked list, after all VMs are guaranteed to have been added to the inventory. This second traversal is described in further detail below at step 530.

At step 524, snapshot client 116 determines whether the entity is a resource pool and, if so, at step 524, snapshot client 116 further determines whether the resource pool is a root resource pool. As previously described herein, in vSphere™, a root resource pool is added by default whenever a cluster or a compute resource is added to virtualized computer inventory 300. However, if the entity is not a root resource pool, then, at step 528, snapshot client 116 adds the resource pool and associates the resource pool with any VMs included therein. By similar reasoning as for the vApps described above in step 520, method 500 guarantees that the VMs included in a resource pool already exist in virtualized computer inventory 300 when the resource pool is added to virtualized computer inventory 300. In addition, because resource pools can be nested, snapshot client 116 also places the resource pool under, if any, an appropriate parent resource pool. Again, because the linked listed is traversed in a parent to child fashion, method 500 guarantees that the parent resource pool will already be added to virtualized computer inventory 300. Finally, snapshot client 116 modifies the resource pool, if necessary, to match any corresponding resource pool settings included in the snapshot.

When snapshot client 116 has traversed all nodes included in the linked list, snapshot client 116 executes step 530 and generates code that, when executed, causes all entities to be moved into their appropriate folders. As previously described, the code generated at step 530 must be executed subsequent to the code generated throughout the first traversal of the linked list. This guarantees that, when the code to move the entities into their appropriate folders is executed, each of the entities has already been added to the reconstructed virtualized computer inventory 300. A similar constraint applies to hosts, networks, and datastores. To perform step 530, snapshot client 116 traverses the linked list to determine, if any, a parent folder for each entity, and generates code that, when executed, moves the entity into its corresponding parent folder. When an entity is added to a virtualized computer inventory, it is implicitly added to the root folder for its type. For example, VMs are automatically added to a root VM folder for a given data center. Therefore, if the parent folder for an entity is a root folder, snapshot client 116 foregoes generating code to move the entity into a parent folder, thereby increasing efficiency.

Referring now back to step FIG. 5A, at step 532, snapshot client 116 initializes a process to generate configuration data code that, when executed, restores configuration data associated with the inventory.

At step 534, snapshot client 116 initializes a process to generate security data code that, when executed, restores security data associated with the inventory, i.e., permissions and roles. Because permissions can be propagated, snapshot client 116 is not required to add permissions for each entity in virtualized computer inventory 300. Instead, snapshot client 116 generates code to add each permission at a highest possible level in virtualized computer inventory 300 and then sets the permissions to propagate accordingly. For example, if a permission corresponds to a data center and all of the VMs included therein, snapshot client 116 is not required to explicitly associate each included VM with a permission. Instead, snapshot client 116 generates code that, when executed, associates the permission with the data center and sets a "propagate" attribute accordingly. However, if a permission exists only for a particular VM, snapshot client 116 explicitly associates the VM with the permission.

At step 536, snapshot client 116 initializes a process to receive modifications to the data code. At step 538, snapshot client 116 presents the data code to a user. For example, snapshot client 116 may display, to the user, the data code in a text editor. At step 540, snapshot client 116 determines that the user has completed his or her updates to the data code. This may be triggered, for example, by detecting that the text editor is closed and that the data code has been updated. Such updates involve, for example, removing portions of code that generate a specific portion of virtualized computer inventory 300. In another example, the updates involve modifying the names of one or more entities included in virtualized computer inventory 300, which is efficiently accomplished by searching for and replacing specific text within the data code. In yet another example, the data code may include markers that are associated with specific portions of code, e.g., code associated with the reconstruction of resource pools. Advantageously, a user may select one or more of the markers so that only the code segments included in the data code and associated with the selected markers are executed by the snapshot client 116, as described below in step 544. Accordingly, the user is able to reconstruct specific sub-portions of the virtualized computer inventory 300.

At step 542, snapshot client 116 parses the data code to determine whether the updates—if any—have established errors in the data code. Optionally, snapshot client 116 may indicate to the user that his or her updates have damaged the data code.

Finally, at optional step 544, snapshot client 116 executes the relational data code, the configuration data code, and the security data code to reconstruct virtualized computer inventory 300. In one embodiment, snapshot client 116 routes the code to VM management center 102 for execution. Accordingly, any updates made to the relational data code, the configuration data code, and/or the security data code are reflected when the virtualized computer inventory 300 is reconstructed, as described below in conjunction with FIG. 6.

Figure 6:
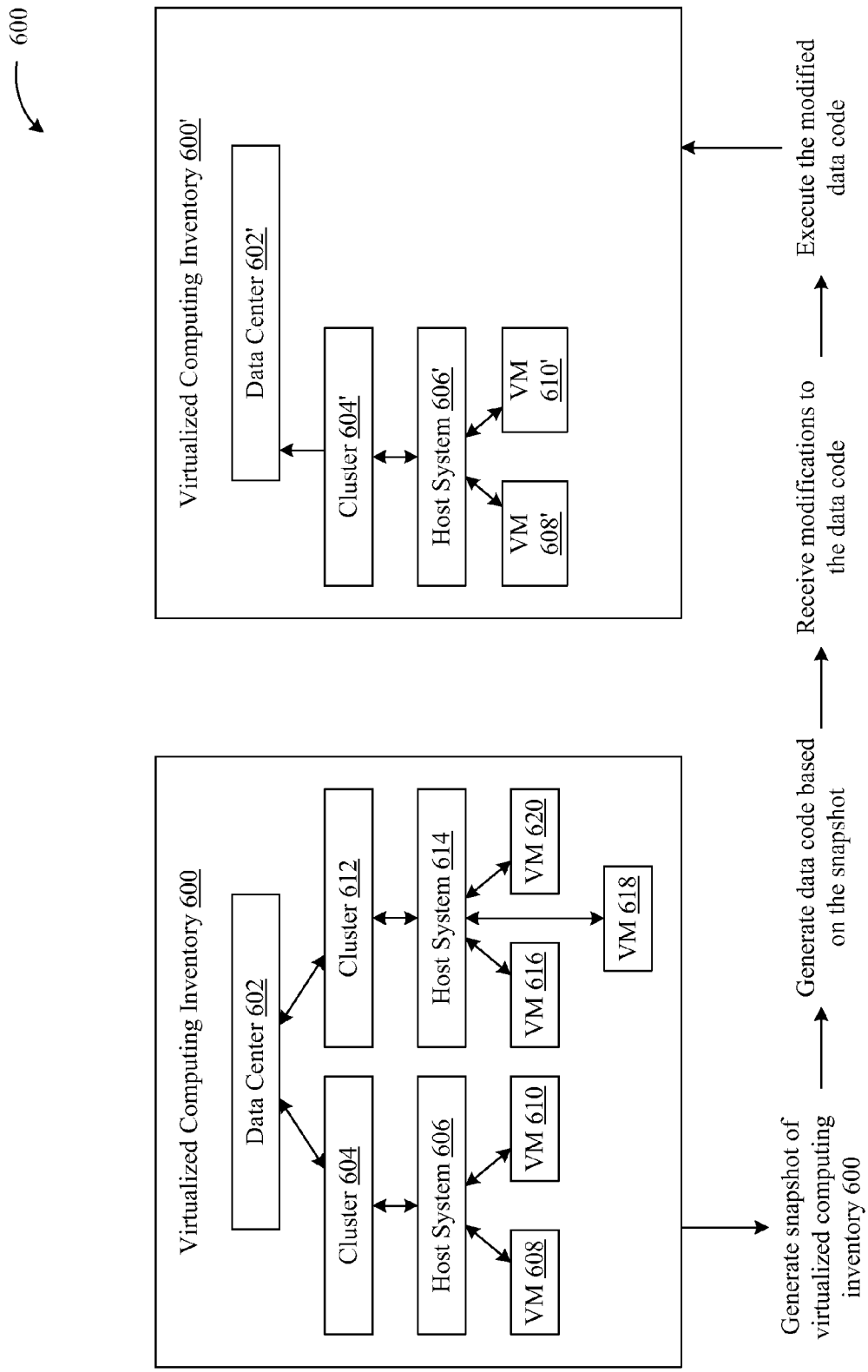
FIG. 6 depicts an exemplary partial reconstruction operation of a virtualized computer inventory, according to one embodiment of the present invention.

FIG. 6 depicts an exemplary partial reconstruction operation of a virtualized computer inventory 600, according to one embodiment of the present invention. As illustrated, virtualized computer inventory 600 includes data center 602, where data center 602 includes cluster 604 and cluster 612. Here, cluster 604 includes host system 606, which includes VM 608 VM 610. Further, cluster 612 includes host system 614, where host system 614 includes VM 616, VM 618, and VM 620.

To perform the partial reconstruction of inventory 600, a snapshot of virtualized computer inventory 600 is first generated according to method 400 described above in conjunction with FIG. 4. Next, data code is generated based on the snapshot and optionally edited by a user according to method 500 described above in conjunction with FIG. 5. In the example shown in FIG. 6, portions of the data code that would otherwise, when executed, cause cluster 612 and all entities included therein to be reconstructed, are removed from the data code. Accordingly, reconstructed virtualized computer inventory 600' does not include cluster 612, as intended by the user.

In sum, one or more embodiments of the invention set forth a programmatic method for archiving and reconstructing a virtualized computer inventory, in whole or in part. Advantageously, such archiving and reconstruction may be used, e.g., for disaster recovery, where periodic archiving is executed such that multiple versions of a virtualized computing inventory may be immediately reconstructed. First, a VM management center is queried to retrieve and store relationships between various entities, the permissions and roles associated with those entities, and the configuration settings of those entities. From this stored data, a code for reconstructing the entire inventory of the virtualized computer system is generated. The code is generated in user-editable format to enable administrators to customize the inventory that is reconstructed from the code. The archiving and storing further allows efficient creation of production inventories from development inventories.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of producing a snapshot of an inventory of a virtualized computer system, comprising:

identifying items in the inventory, the items including virtual machines, servers on which the virtual machines are running, one or more data centers in which the servers reside, and logical containers, the logical containers including folders that include virtual machines, resource pools that each contains one or more virtual machines, and server clusters that each contains one or more servers;

determining hierarchical relationships between the items, wherein the hierarchical relationships between the items comprise hierarchical relationships between items of different categories, wherein the determining hierarchical relationships comprises:

querying for object references that each references a different item in the inventory;

for each object reference, determining an immediate parent item to the referenced item, wherein for at least one object reference, the referenced item comprises a server cluster in a data center and the immediate parent item of the referenced item comprises the data center; and creating, based on the determined immediate parent items, inventory relational data of the items in the inventory;

determining other relationships of the items, including a relationship between a resource pool and a group of virtual machines that is not hierarchical; and storing identifying data for the items, the hierarchical relationships, and the other relationships in a storage device as a snapshot of the inventory.

2. The method of claim 1, further comprising:

storing permissions for users of the virtualized computer system in the storage device as part of the snapshot of the inventory, the permissions defining actions that may be performed on the items by the users.

3. The method of claim 2, wherein the permissions are hierarchical and redundant permissions are not stored in the storage device as part of the snapshot of the inventory.

4. The method of claim 1, wherein the items include a distributed virtual switch and the other relationships include a relationship between the distributed virtual switch and a group of virtual machines that are configured to use the distributed virtual switch.

5. The method of claim 4, further comprising:

storing port configurations of the virtual machines in the distributed virtual switch.

6. The method of claim 1, wherein the items include a datastore and the other relationships include a relationship between the datastore and a group of servers that are configured to use the datastore as a persistent storage unit.

7. The method of claim 1, wherein the virtualized computer system includes a management server and said identifying and determining includes:

querying the management server for configuration data that includes:

(a) data pertinent to creation of a cluster or host upon reconstructing the virtualized computer system, such that the querying yields compute resource configuration data;

(b) data specifying network configuration, such that the querying yields networking configuration data, such that the querying yields networking configuration data; and (c) data specific to performing a reconstruction of the inventory, such that the querying yields inventory configuration data;

wherein storing the identifying data as a snapshot includes encapsulating the inventory relational data in a format in which the items in the inventory are represented in the snapshot and parent-to-child relationships among the items are represented in the snapshot.

8. A method of producing a snapshot of an inventory of a first virtualized computer system and generating a second virtualized computer system from the snapshot, comprising:

producing a snapshot of an inventory of a first virtualized computer system, the snapshot being dedicated to identifying items in the inventory and relationships among the items rather than state or stored information within the items, the items including virtual machines, servers on which the virtual machines are running, one or more data centers in which the servers reside, and logical containers, the logical containers including folders that include virtual machines, resource pools that each contains one or more virtual machines, and server clusters that each contains one or more servers, wherein producing the snapshot of the inventory of the first virtualized computer system comprises determining hierarchical relationships between the items, wherein the hierarchical relationships between the items comprise hierarchical relationships between items of different categories, wherein the determining hierarchical relationships comprises:

querying for object references that each references a different item in the inventory;

for each object reference, determining an immediate parent item to the referenced item, wherein for at least one object reference, the referenced item comprises a server cluster in a data center and the immediate parent item of the referenced item comprises the data center; and creating, based on the determined immediate parent items, inventory relational data of the items in the inventory;

generating a user-editable code from the snapshot;

modifying the user-editable code; and generating a second virtualized computer system using the modified user-editable code.

9. The method of claim 8, wherein the second virtualized computer system has an inventory of items that are different from the inventory of items of the first virtualized computer system.

10. The method of claim 9, wherein relationships between the items in the inventory of the second virtualized computer system are the same as the relationships between corresponding items in the inventory of the first virtualized computer system.

11. The method of claim 9, wherein configurations of the items in the inventory of the second virtualized computer system are the same as corresponding items in the inventory of the first virtualized computer system.

12. The method of claim 8, wherein the number of items represented in the user-editable code is reduced as a result of said modifying.

13. The method of claim 12, wherein the second virtualized computer system has an inventory of items that represents a subset of the inventory of the first virtualized computer system.

14. The method of claim 8, wherein permissions for users of the first virtualized computer system are stored and the second virtualized computer system generated using the modified user-editable code includes the same permission for the users.

15. A non-transitory computer-readable medium comprising a snapshot for restoring an inventory of a virtualized computer system, the snapshot being dedicated to relationships among items of the inventory rather than content of the items, the snapshot including (a) identifying data for items in the inventory of the virtualized computer system, (b) first relationship data that indicate hierarchical relationships between the items, wherein the hierarchical relationships between the items comprise hierarchical relationships between items of different categories, wherein the first relationship data is created based on immediate parent items to different items in the inventory, and (c) second relationship data that indicate other non-hierarchical relationships between the items, wherein the items include virtual machines, servers on which the virtual machines are running, one or more data centers in which the servers reside, and logical containers, the logical containers including folders that include virtual machines, resource pools that each contains one or more virtual machines, and server clusters that each contains one or more servers, wherein a particular item in the inventory comprises a server cluster in a data center and an immediate parent item of the particular item comprises the data center.

16. The non-transitory computer-readable medium of claim 15, wherein the other non-hierarchical relationships include a relationship between a resource pool and a group of virtual machines.

17. The non-transitory computer-readable medium of claim 15, wherein the snapshot further includes permissions for users of the virtualized computer system that define actions that may be performed on the items by the users.

18. The non-transitory computer-readable medium of claim 15, wherein the items include a distributed virtual switch and the other non-hierarchical relationships include a relationship between the distributed virtual switch and a group of virtual machines that are configured to use the distributed virtual switch.

19. The non-transitory computer-readable medium of claim 15, wherein the items include a datastore and the other non-hierarchical relationships include a relationship between the datastore and a group of servers that are configured to use the datastore as a persistent storage unit.

20. The non-transitory computer-readable medium of claim 15, further comprising instructions for causing a computer system to generate user-editable code from the snapshot.

\* \* \* \* \*